Figure 1:
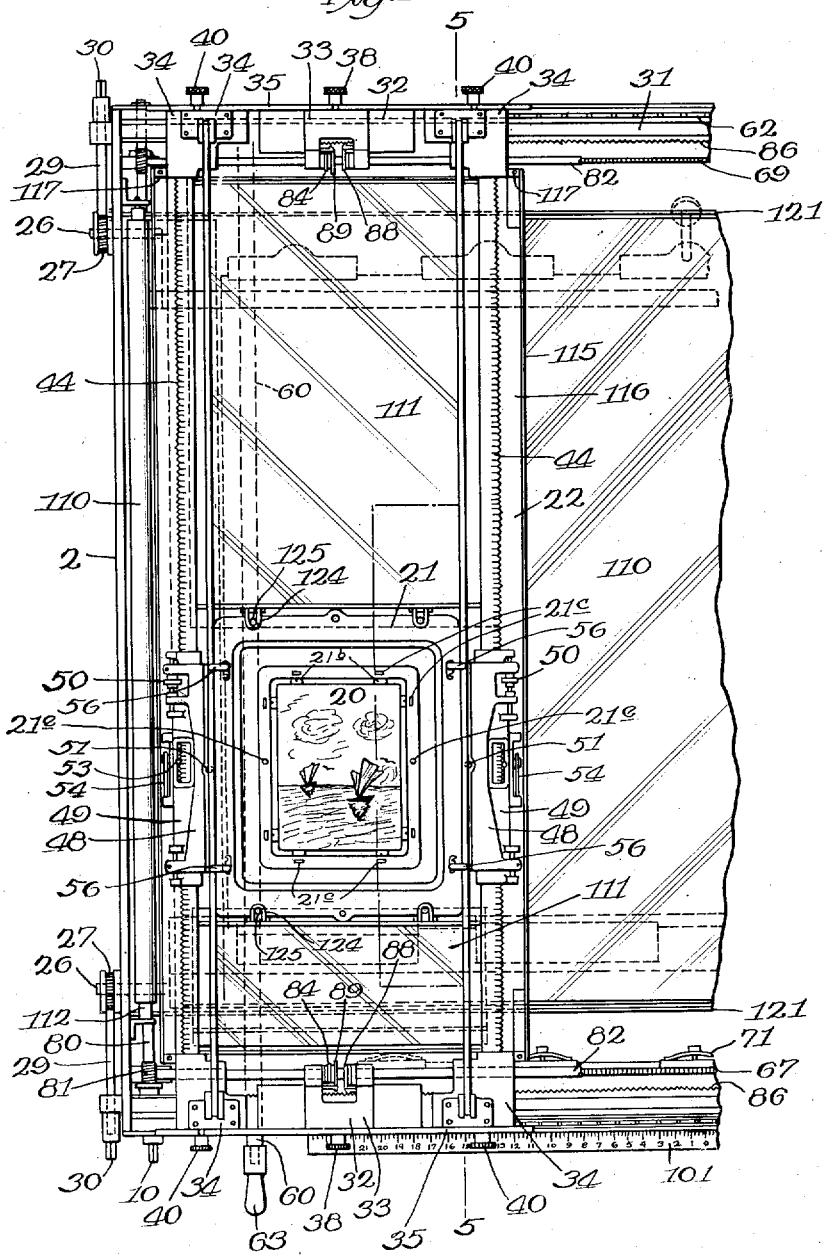

March 8, 1927. Re. 16,567

A. T. KOPPE

MACHINE FOR MAKING OFFSET PRESS PLATES

Original Filed June 30, 1922 11 Sheets-Sheet 1

Inventor:
Alexander T. Koppe
By Rector, Hibben, Davis & Macauley, Attys.

March 8, 1927. A. T. KOPPE Re. 16,567

MACHINE FOR MAKING OFFSET PRESS PLATES

Original Filed June 30, 1922 11 Sheets-Sheet 2

Inventor:
Alexander T. Koppe
By Rector, Hibben, Davis & Macauley, Attys.

March 8, 1927. Re. 16,567
A. T. KOPPE
MACHINE FOR MAKING OFFSET PRESS PLATES
Original Filed June 30, 1922 11 Sheets-Sheet 3
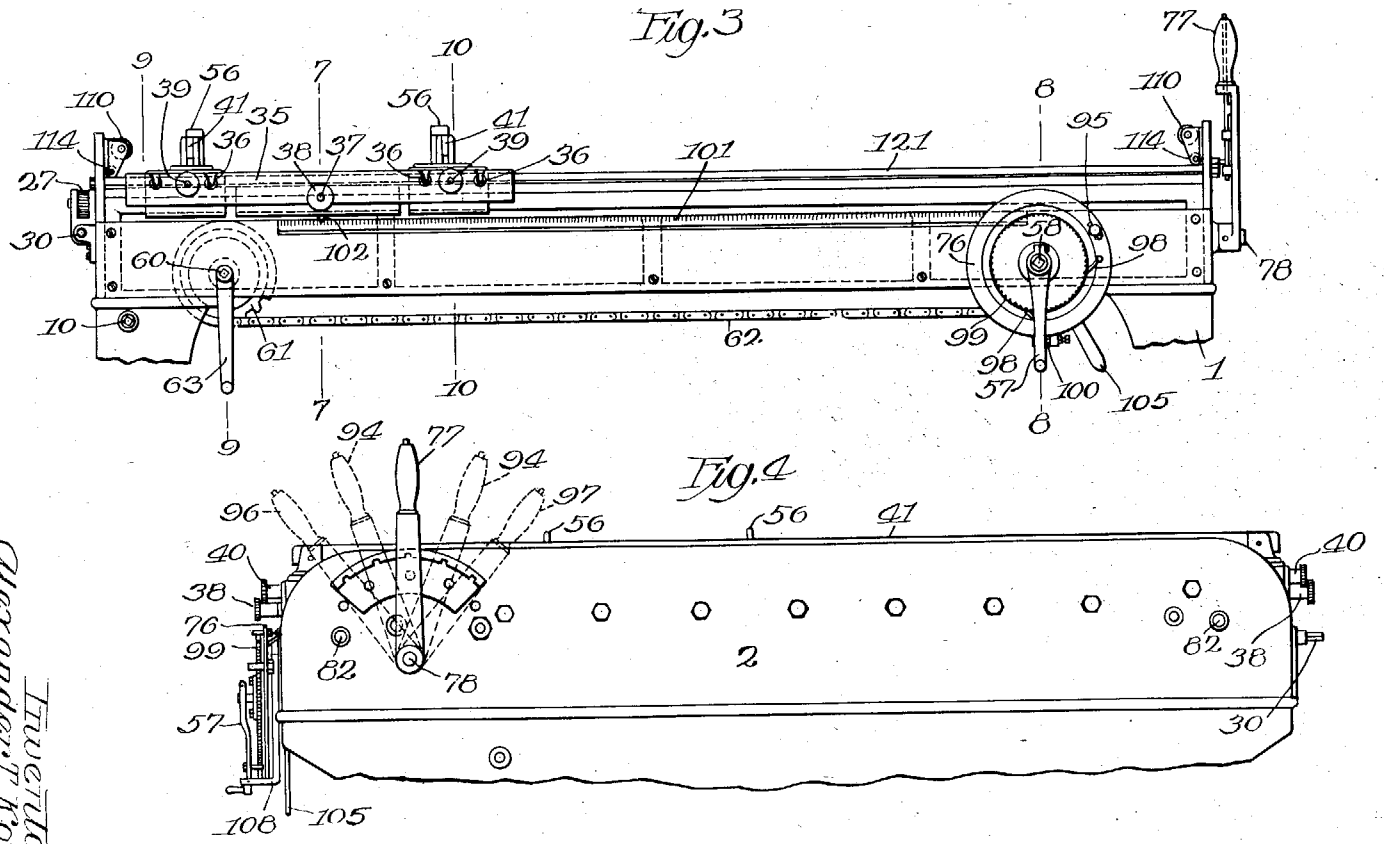
Inventor
Alexander T. Koppe
By Rector, Hibben, Davis & Macauley Attys March 8, 1927. A. T. KOPPE Re. 16,567

MACHINE FOR MAKING OFFSET PRESS PLATES

Original Filed June 30, 1922 11 Sheets-Sheet 4

Inventor:
Alexander T. Koppe
By Rector, Hibben, Davis & Macauley, Attys.

March 8, 1927. A. T. KOPPE Re. 16,567

MACHINE FOR MAKING OFFSET PRESS PLATES

Original Filed June 30, 1922 11 Sheets-Sheet 5

Inventor:
Alexander T. Koppe,
By Rector, Hibben, Davis & Macauley, Attys.

March 8, 1927. A. T. KOPPE Re. 16,567

MACHINE FOR MAKING OFFSET PRESS PLATES

Original Filed June 30, 1922 11 Sheets-Sheet 6

Inventor:
Alexander T. Koppe
By Rector, Hibben, Davis & Macauley, Attys.

March 8, 1927. A. T. KOPPE Re. 16,567

MACHINE FOR MAKING OFFSET PRESS PLATES

Original Filed June 30, 1922 11 Sheets-Sheet 7

Inventor
Alexander T. Koppe
By Rector, Hibben, Davis & Macauley, Attys.

March 8, 1927. A. T. KOPPE Re. 16,567

MACHINE FOR MAKING OFFSET PRESS PLATES

Original Filed June 30, 1922 11 Sheets-Sheet 8

Inventor
Alexander T. Koppe
By Rector, Hibben, Davis & Macauley, Attys.

March 8, 1927. Re. 16,567

A. T. KOPPE

MACHINE FOR MAKING OFFSET PRESS PLATES

Original Filed June 30, 1922 11 Sheets-Sheet 9

Inventor:
Alexander T. Koppe
By Rector, Hibben, Davis & Macauley, Attys.

March 8, 1927. Re. 16,567

A. T. KOPPE

MACHINE FOR MAKING OFFSET PRESS PLATES

Original Filed June 30, 1922 11 Sheets-Sheet 10

Inventor:
Alexander T. Koppe
By Rector, Hibben, Davis & Macauley, Attys.

March 8, 1927. Re. 16,567

A. T. KOPPE

MACHINE FOR MAKING OFFSET PRESS PLATES

Original Filed June 30, 1922 11 Sheets-Sheet 11

Inventor:
Alexander T. Koppe
By Rector, Hibben, Davis and Macauley, Attys.

Reissued Mar. 8, 1927. Re. 16,567

UNITED STATES PATENT OFFICE.

ALEXANDER T. KOPPE, OF CHICAGO, ILLINOIS, ASSIGNOR, BY MESNE ASSIGNMENTS, TO DIRECTOPLATE CORPORATION, A CORPORATION OF ILLINOIS.

MACHINE FOR MAKING OFFSET PRESS PLATES.

Original No. 1,510,007, dated September 30, 1924, Serial No. 572,054, filed June 30, 1922. Application for reissue filed September 25, 1926. Serial No. 137,787.

The invention relates to photographic machines for making offset press plates from negatives carried by a frame, which frame may be quickly and accurately positioned at various points over the press plate in such a manner that the press plate may be substantially entirely covered with images from the negative. The machine is particularly adapted for use in connection with a pressure frame of the type shown in Patent No. 1,396,962, issued November 15, 1921, on the application of Alexander T. Koppe.

A further object is to provide a machine for making offset press plates constructed in such a manner that a negative on which a vision is disposed may be accurately positioned at predetermined points above a sensitized piece of zinc used in the usual printing process, and the vision on the negative reproduced on the press plate.

A further object is to mount the negative in a pressure frame disposed above the press plate and carried by a carriage longitudinally movable over the press plate and transversely movable on the carriage, said carriage being controllable in its longitudinal movement in such a manner that it may be accurately positioned and the pressure frame provided with means whereby it may be accurately positioned transversely on the carriage.

A further object is to provide curtains connected to the carriage whereby the portion of the press plate, which is not protected from the light rays by the carriage and pressure frame or disposed beneath the negative will be protected from the light. The pressure frame has connected thereto curtains which will protect the press plate from the light when the pressure frame is moved transversely of the machine.

A further object is to provide means whereby when the carriage or pressure frame is being moved it will be raised out of engagement with the press plate, thereby preventing scratching or damaging of the press plate.

A further object is to provide the machine with a bed plate on which is stretched a rubber sheet on which the press plate is disposed and stretched, said rubber sheet forming means whereby the sensitized press plate, which is formed preferably from zinc, will closely engage the negative and conform to the irregularities thereof, such, for instance, as variations in the thickness of the glass forming the negative.

A further object is to provide pivoted bars adjacent the end of the machine and cooperating with the ends of the press plate for forming an air seal and at the same time forming an extension whereby the pressure frame may be positioned so that the negative will extend to the side of the press plate, while at the same time securing close contact between the negative and press plate, thereby allowing the entire surface of the press plate to be utilized.

A further object is to provide clamping means for holding the ends of the press plate, and means whereby said press plate may be stretched or drawn taut on the rubber sheet. Also to provide lever controlled sprocket and chain means for moving the carriage longitudinally and dial means whereby the distance of movement may be accurately gauged.

A further object is to provide means whereby the spaced blocks forming the carriages at opposite sides of the machine may be spaced apart at various distances, thereby spacing the lifting bars and pressure frame supporting bars in such a manner that various sizes of pressure frames may be supported on the carriage.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figure 2:
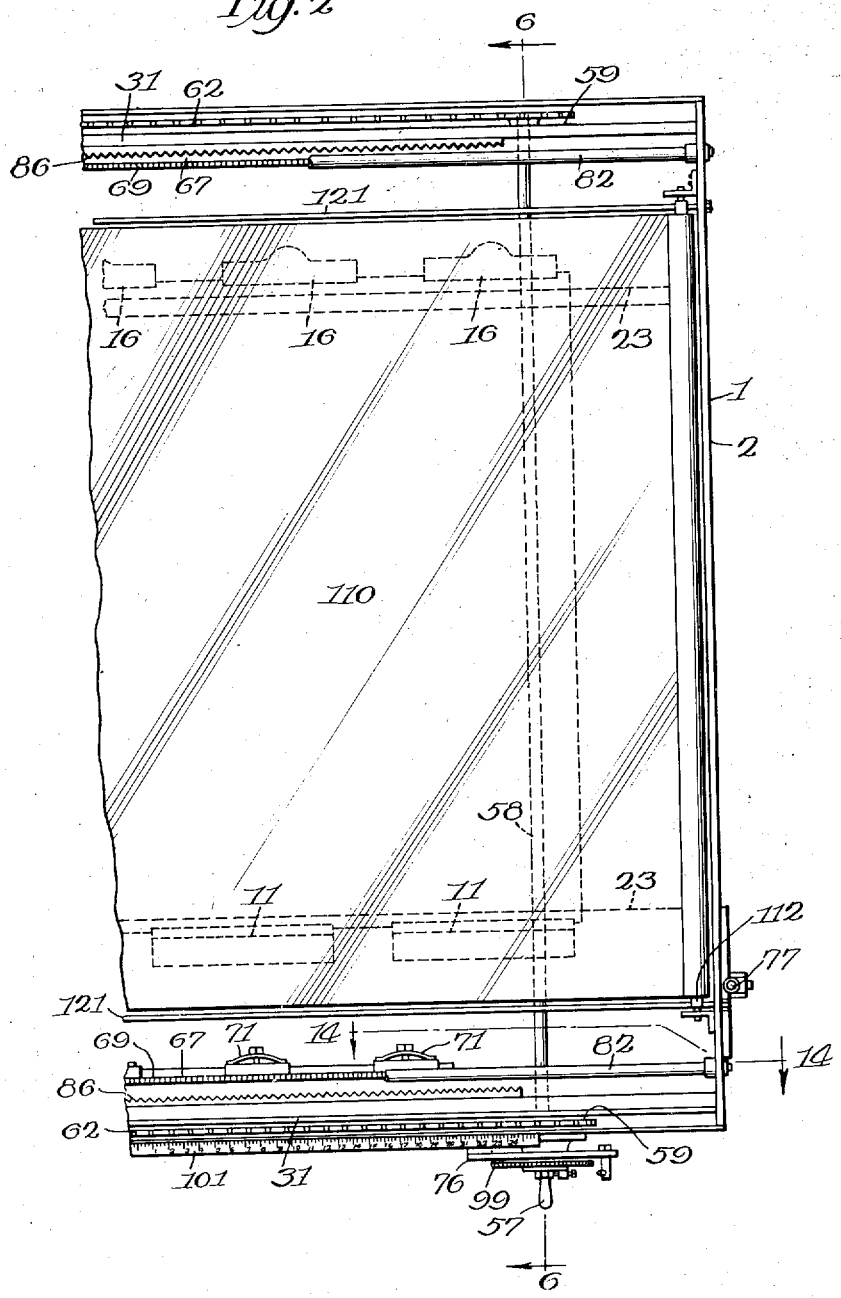
Figure 5:
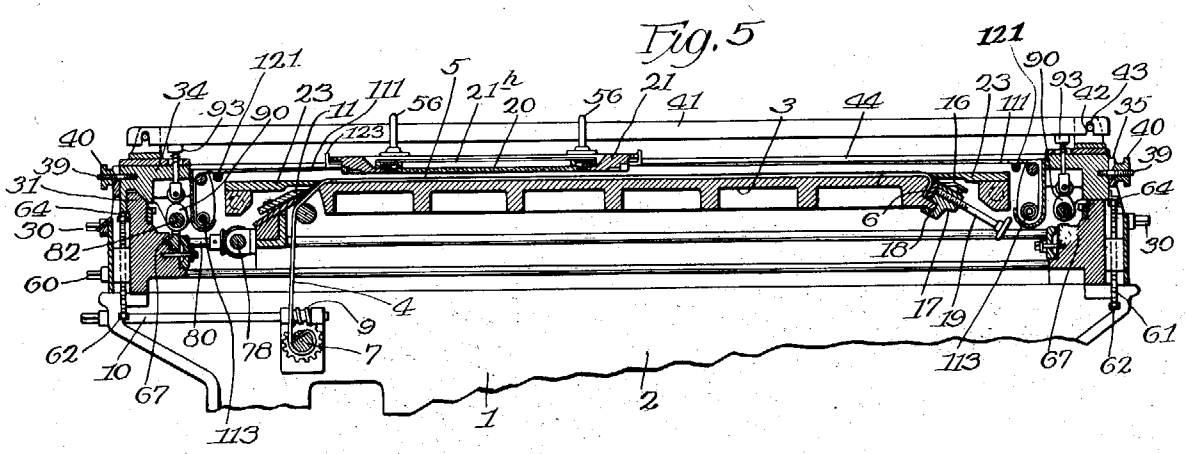
Figure 6:
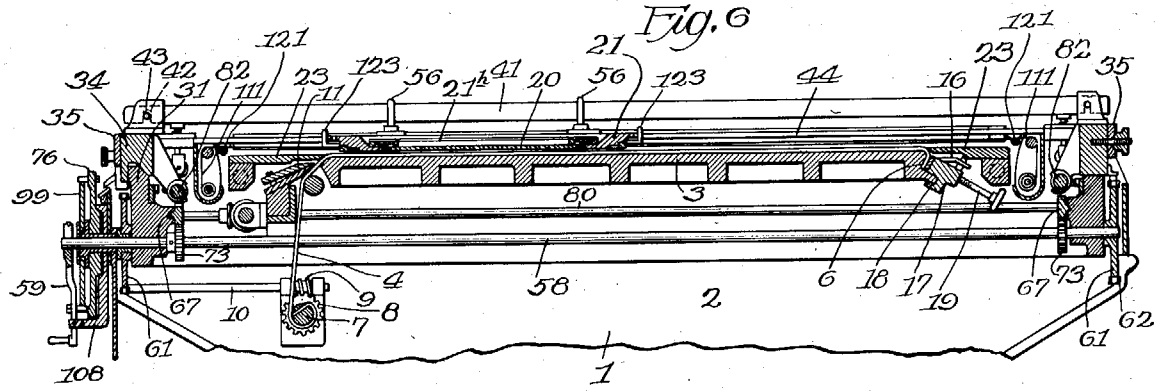
Figure 7:
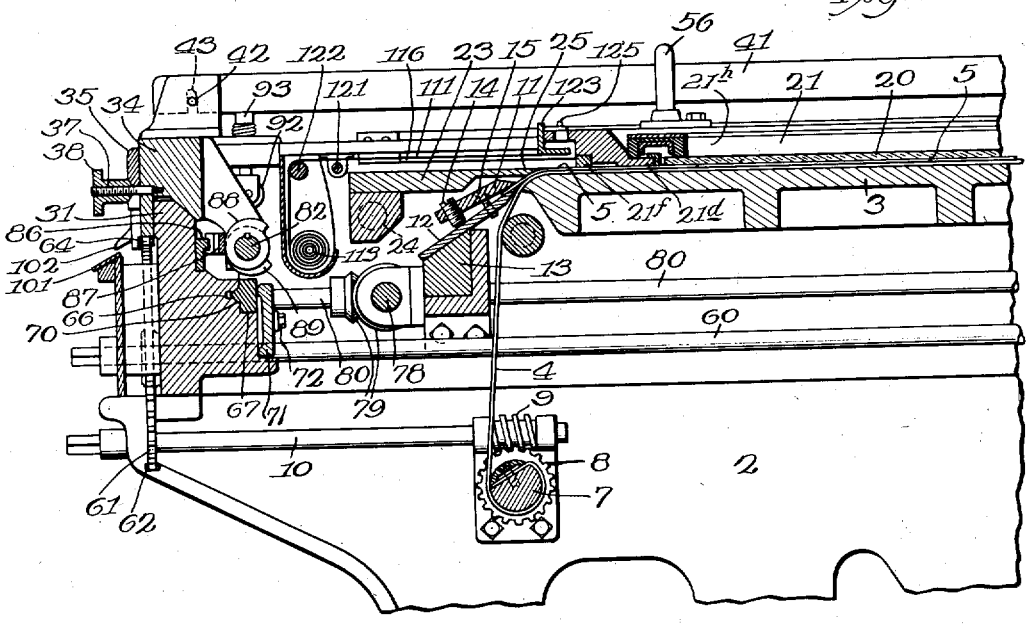
Figure 8:
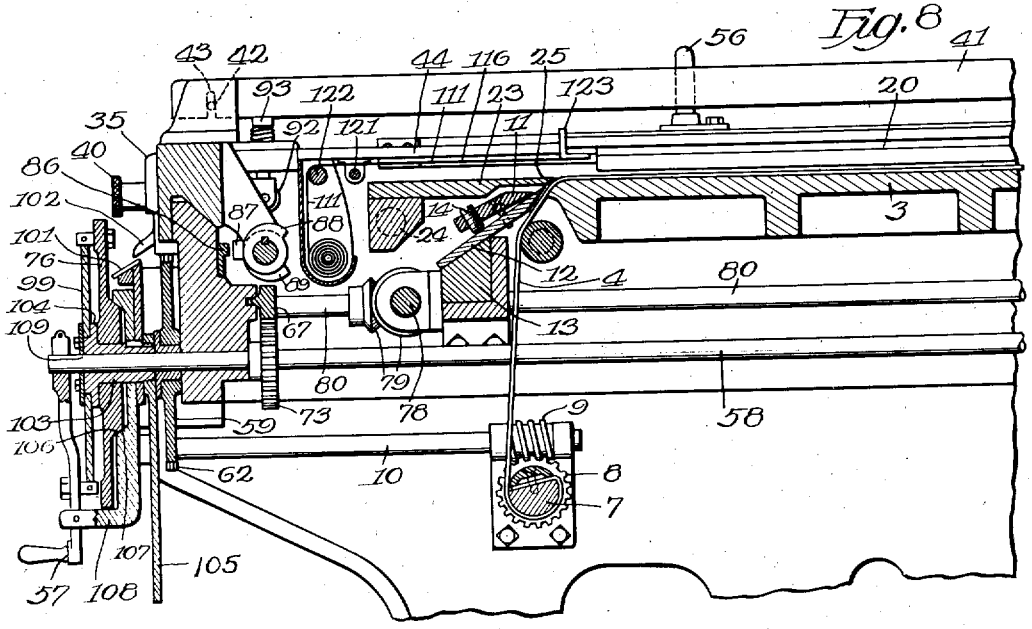
Figure 9:
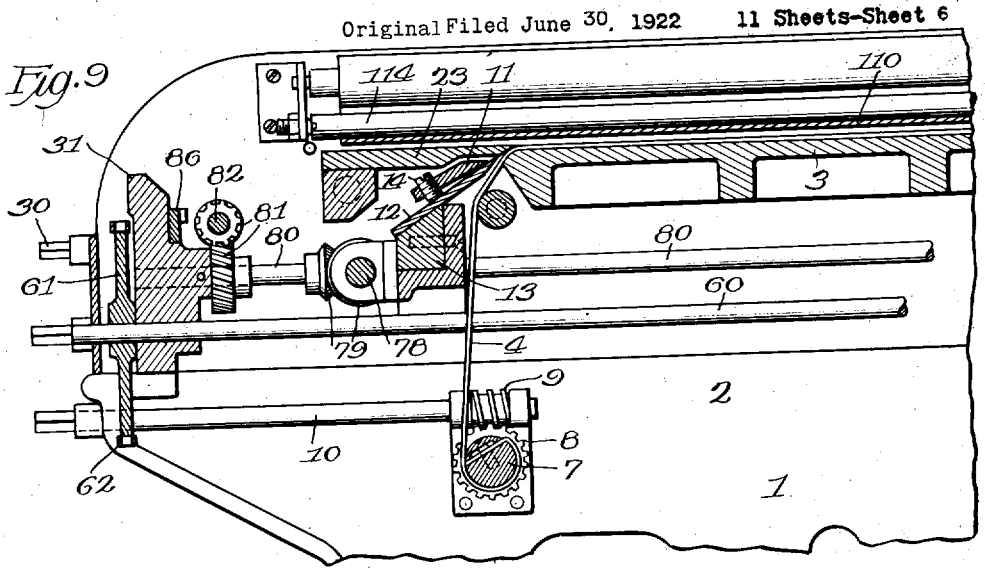
Figure 10:
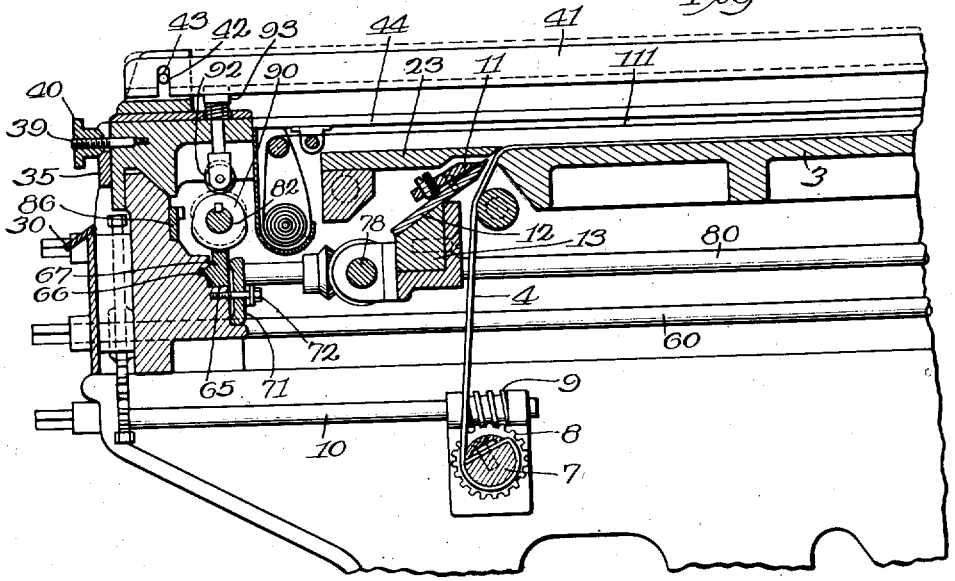
Figure 11:
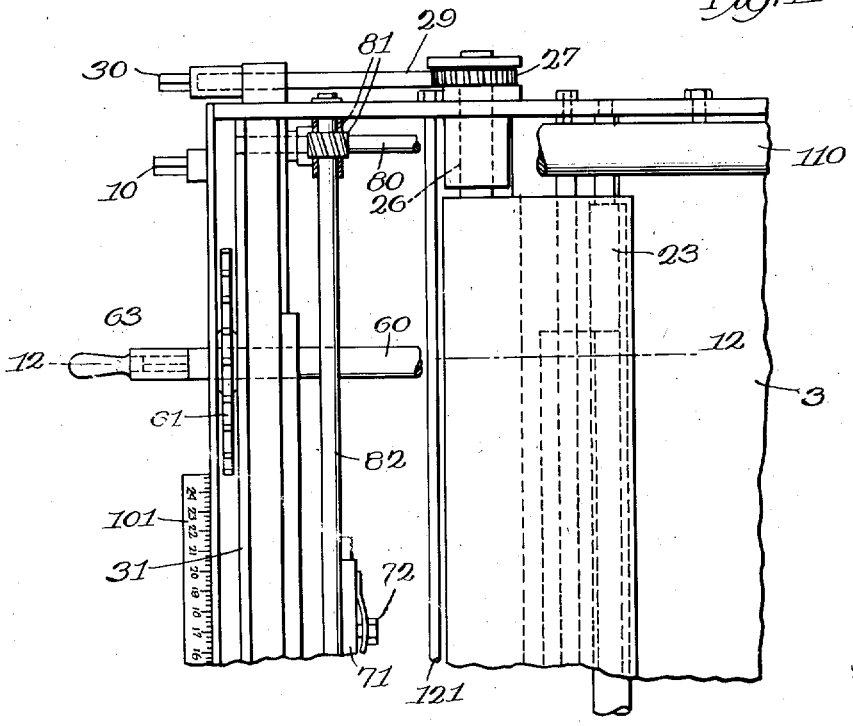
Figure 12:
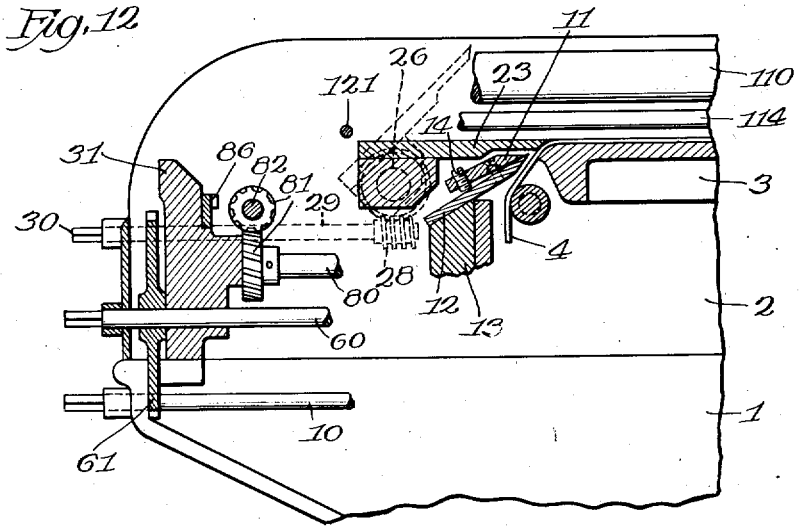
Figure 13:
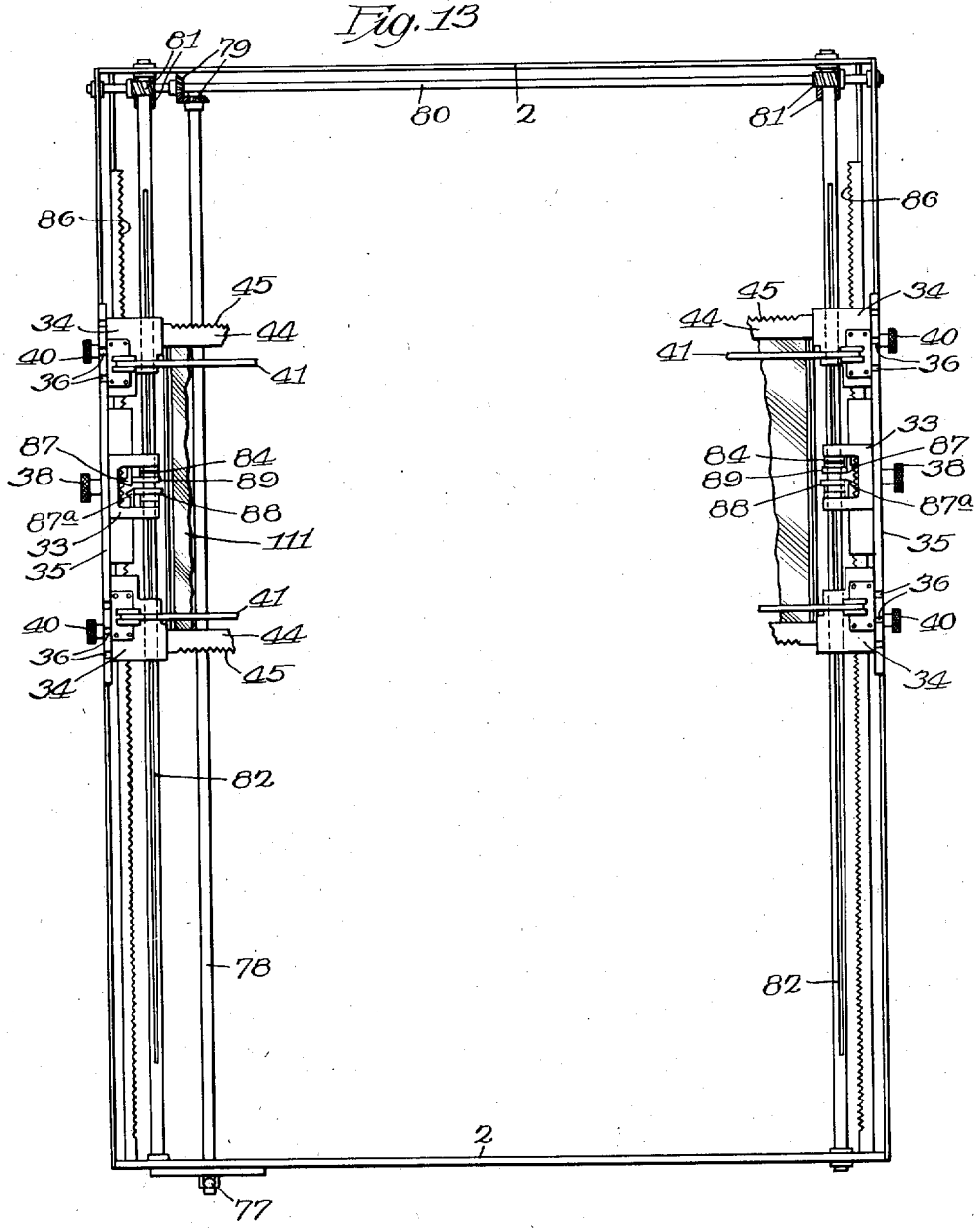
Figures 14, 15:
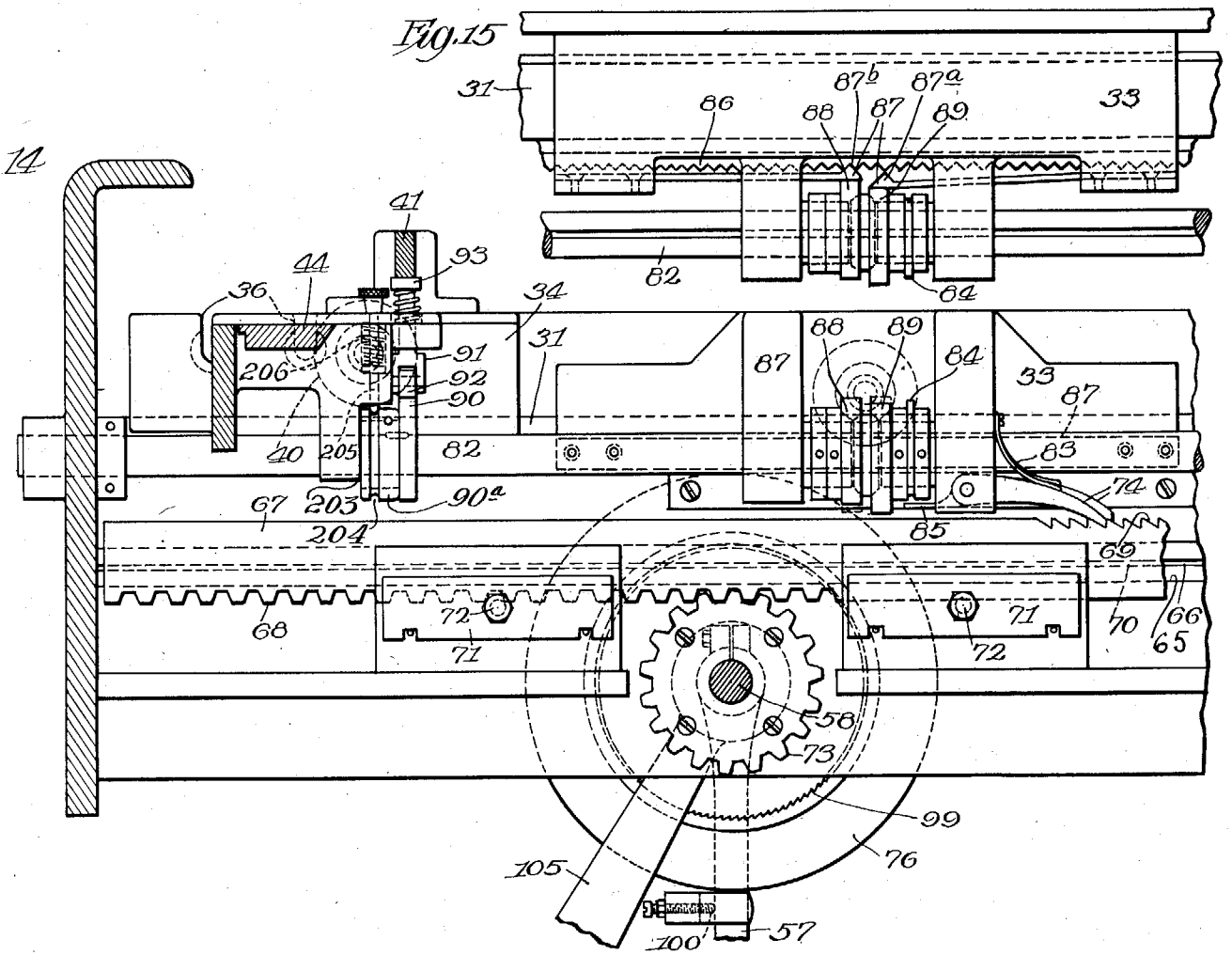
Figure 16:
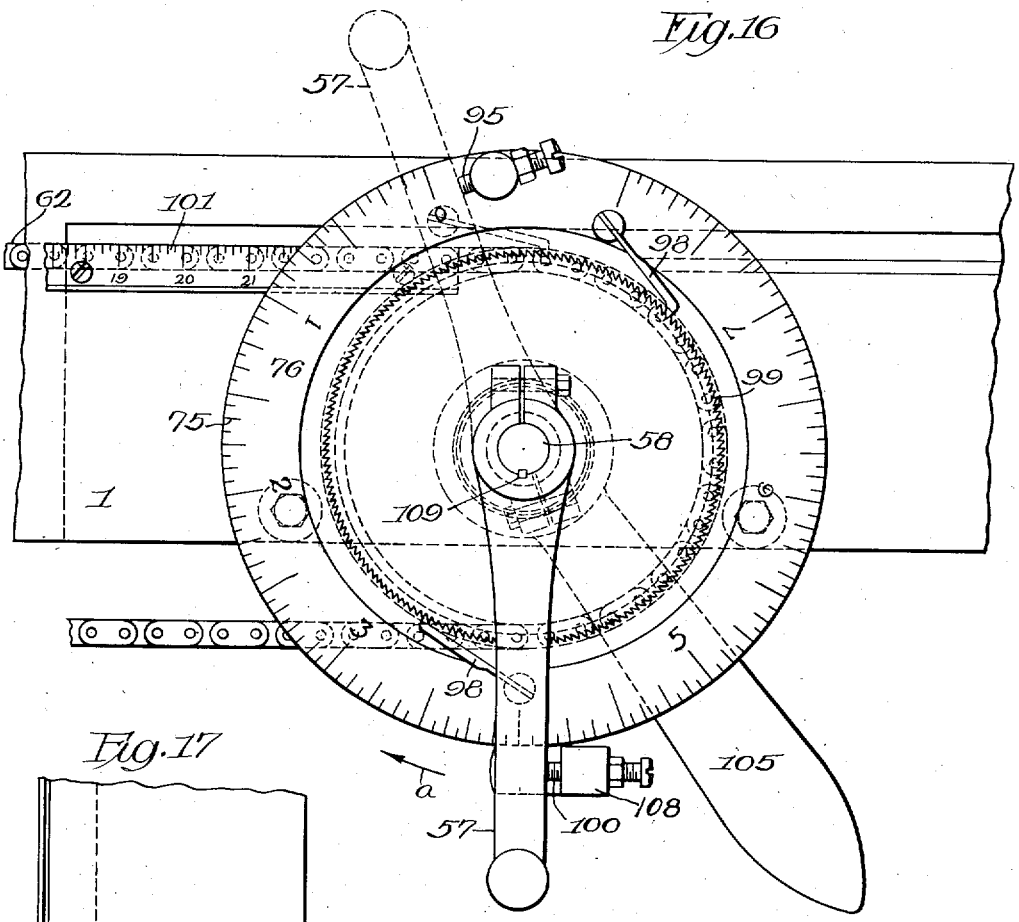
Figure 17:
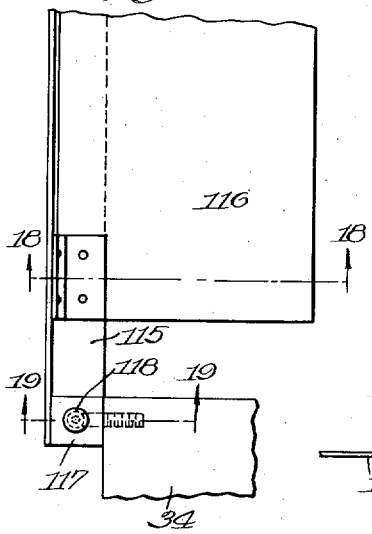
Figure 18:
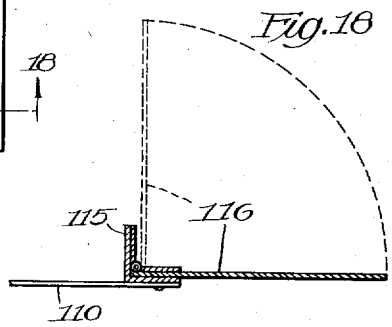
Figure 19:
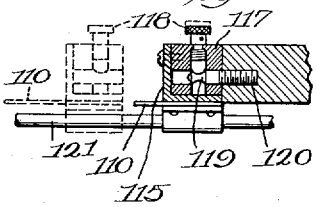
Figure 20:
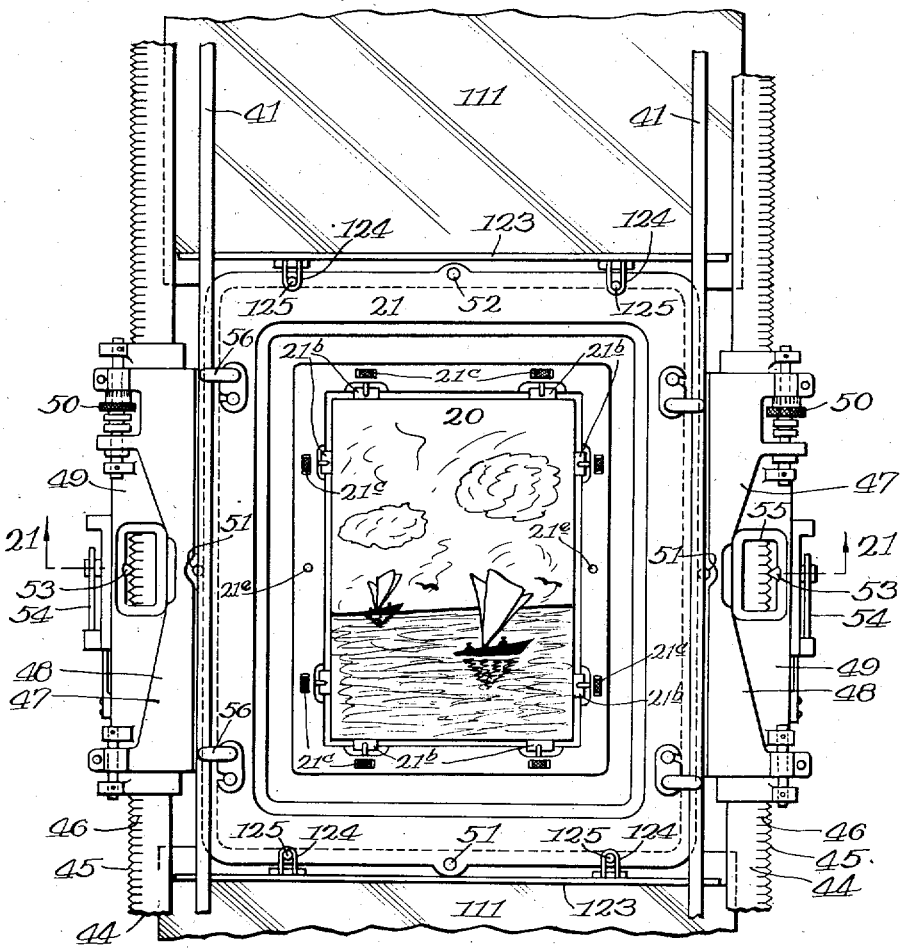
Figure 21:
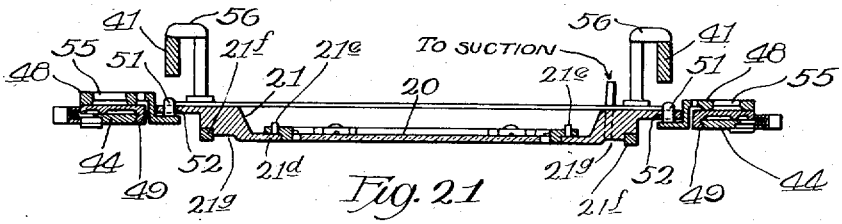

In the drawings, Figure 1 is a top plan view of the left hand side of the machine; Fig. 2 is a top plan view of the right hand side of the machine; Fig. 3 is a front elevation of the machine; Fig. 4 is an end view of the machine; Fig. 5 is a vertical transverse sectional view through the machine taken on line 5—5 of Fig. 1; Fig. 6 is a vertical transverse sectional view through the machine taken on line 6—6 of Figure 2 and showing the carriage and pressure frame in section; Fig. 7 is an enlarged detail sectional view taken on line 7—7 of Fig. 3; Fig. 8 is an enlarged detail sectional view taken on line 8—8 of Fig. 3 showing a portion of the carriage in section, and showing the pressure frame; Fig. 9 is a vertical transverse sectional view through one side of the machine taken on line 9—9 of Fig. 3; Fig. 10 is a vertical detail sectional view through one side of the machine and one of the side blocks of the carriage taken on line 10—10 of Fig. 3; Fig. 11 is an enlarged plan view of the left front corner of the machine; Fig. 12 is a sectional view taken on line 12—12 of Fig. 11; Fig. 13 is a plan view of the frame of the machine, portions of the carriage and controlling shafting, the bed plate and adjacent mechanism being eliminated to better show the structure; Fig. 14 is a detail sectional view taken on line 14—14 of Fig. 2 and showing the carriage at the right hand side of the machine; Fig. 15 is a top plan view of the central carriage block and adjacent parts; Fig. 16 is a front elevation of the dial and controlling lever; Fig. 17 is an enlarged plan view of a portion of one of the side carriage blocks, showing means for attaching a curtain thereto and a hinged shield for extending under the pressure frame; Fig. 18 is a sectional view taken on line 18—18 of Fig. 17; Fig. 19 is a sectional view taken on line 19—19 of Fig. 17; Fig. 20 is a top plan view of the pressure frame showing the same mounted on carriage guide bars and portions of screening curtains; Fig. 21 is a transverse sectional view taken on line 21—21 of Fig. 20.

Referring to the drawings the numeral 1 designates the frame of the machine and 2 the end members thereof. The end members 2 are connected together by means of the horizontally disposed bed plates 3 on which bed plate a rubber blanket 4 is disposed. The press plate 5 which is shown in Figure 7 rests on the blanket 4, and is only shown in Figures 5 and 7, being eliminated in other figures for purposes of clearness. The rubber blanket is secured at one end 6 to the bed plate 3 and at its other end is wound around a roller 7, which roller is mounted in bearings of the end members 2 of the frame and is provided with a worm gear 8, with which a worm 9 engages, said worm 9 being carried by a shaft 10 extending through the front of the machine and adapted to receive a crank, by means of which crank the roller 7 may be rotated and the blanket 4 drawn taut for closely engaging the bed plate 3. One end of the press plate 5 is clamped between a clamping plate 11 and a plate 12 mounted on the bar 13 extending the full length of the machine. A clamping action is given to the plate 11 by turning the screws 14, the screws 15 carried by the plate 12 forming a fulcrum as clearly shown in Figures 7 and 8. The opposite side of the press plate is received in the clamps 16 and firmly held, said clamps being carried by the adjustable bar 17 which has a sliding connection 18 with one side of the bed plate 3. Threaded through the adjustable bar 17 are adjusting screws 19, the inner ends of which cooperate with the edge of the bed plate 3 in such a manner that, when the adjusting screws are tightened, the press plate 5 will be drawn perfectly flat and smooth upon the rubber blanket 4, said blanket being slightly yieldable under pressure so that when the negative 20 is forced into contact with the press plate 5 by the vacuum pressure frame 21 through the means hereinafter set forth, the glass negative 20 and press plate will accommodate themselves to each other and perfect contact be obtained. Glass negative plates are sometimes slightly warped or are thicker at one portion than another, hence the provision of the rubber blanket to overcome these variations and also to prevent breakage of the negative incident to the above irregularities. The vacuum pressure frame 21 is carried by a carriage 22 extending transversely across the machine above the bed plate, said carriage being adapted to be moved longitudinally over the bed plate and the vacuum frame to be manually moved transversely over the bed plate. Any kind of light may be disposed above the machine for supplying the necessary light rays above the negative, no light being shown in the drawings for purposes of clearness.

The negative 20 bearing an impression which is to be reproduced on the sensitized zinc plate 5, is carried by the vacuum frame 21 and mounted directly in the auxiliary negative frame $21^a$ (see Figure 21) in which it is held by clamping plates $21^b$ and adjusting screws $21^c$, as shown in Fig. 20. The vacuum frame 21 has an annular inwardly projecting flange $21^d$ adapted to receive the overlying outwardly extending flange of the negative frame, as shown in Fig. 21 and the negative frame is positioned on the vacuum frame by means of pins $21^e$ extending upwardly from the flanges $21^d$ and engaging apertures in the outer flanges of the negative frame on opposite sides thereof. The under side of the vacuum frame 21 is recessed upwardly from its outer edge to receive an annular rectangular sealing ring $21^f$ of rubber or other compressible material which is secured in position to form the outer wall of the annular air channel $21^g$ from which the air may be exhausted through a pipe as shown in my prior patent above referred to. When the vacuum frame 21 is lowered, the lower sealing ring $21^f$ engages the upper surface of the sensitized plate 5 to form an air-tight seal around the lateral edges of the vacuum frame, and the passage of air through the spaces around the negative and around the auxiliary negative frame is prevented by an upper annular sealing ring $21^h$ of rectangular form which rests on the upper surfaces of the negative and vacuum frame, as shown in Fig. 7. When suitable suction means is connected to a pipe leading downwardly through the vacuum frame 21 and communicating with the channel 21[g], the air between the negative and the press plate is drawn into the channel 21[g] and exhausted through the pipe, so that a vacuum is produced between the negative and the sensitized sheet with the result that the negative is forced by atmospheric pressure into close contact with the sensitized sheet, thus producing a close contact adapted for the reproduction of the impression of the negative on the sensitized plate when the negative is exposed to a suitable source of light mounted above the machine.

In order that a vacuum may be obtained and a close contact between the negative and press plate secured when the vacuum frame 21 is projected beyond the edges of the bed plate at the front and rear sides of the machine, auxiliary sealing plates 23 are provided to act as continuations of the top surface of the press plate. These sealing plates 23 extend longitudinally of the machine at each side of the bed plate and are pivotally connected at 24 to the ends 2 of the frame, and after the press plate has been inserted as above described, they are turned downwardly to the horizontal positions shown in Figures 7 and 8 with their ends 25 in engagement with the press plate, thereby forming a substantially air tight seal. The sealing plates 23 when thus closed have their upper surfaces in substantially the same horizontal plane as the top surface of the press plate and it is obvious that when the vacuum pressure frame 21 is adjacent one of the sides of the press plate 5, the frame may engage one of the sealing plates 23 in such a manner that it is positioned beyond the marginal edge of the press plate while at the same time sealing the under side of the overlapping portion of the vacuum frame so that an effective vacuum is maintained for securing a close contact of the negative and press plate and obtaining a print of the subject at the very margin of the press plate, thus permitting a greater number of prints to be made on a plate than would otherwise be possible with the use of a vacuum pressure frame. The pintles 26 of the sealing plates 23 extend through one of the ends 2 of the frame and are provided with worm gears 27 (see Figs. 1 and 3) with which worms 28 carried by shafts 29 engage, said shafts being adapted to receive, on their rectangular shaped ends 30, cranks by means of which the shafts 29 may be rotated and the edges 25 of the sealing plates 23 may be forced into close and binding engagement with the edges of the press plate, thereby forming substantially air tight engagement which will not interfere with the operation of the vacuum pressure frame 21.

Disposed at the front and rear sides of the machine are track ways 31, on which track ways the carriage 22 is slidably mounted in such a manner that the carriage may be positioned in various positions longitudinally above the bed plate and the press plate carried thereby, thereby allowing the negative carrying frame and vacuum pressure frame 21 to be positioned longitudinally as desired. Disposed in opposite relation on said track ways are substantially identical carriage blocks 32 consisting each of a center block 33 and side blocks 34, each set of blocks being connected together by a plate 35 to move in unison. Each plate 35 is provided with a series of notches 36 equidistant from the center of the connected middle block 33. The middle block is provided with a threaded pin 37 having threaded thereon a thumb nut 38, which thumb nut serves to clamp the plate 35 to the middle block 33. The side blocks 34 are provided with threaded pins 39 having thumbs nuts 40, which threaded pins are adapted to be received by any of the series of notches 36 in the upper edge of the plate. By providing the pin and notch connections, it will be seen that the side blocks 34 of each carriage block may be positioned at different distances apart for readily locating the lifting bars 41, which connect the oppositely disposed blocks 34 together, at different distances apart for cooperating with vacuum pressure frames of different widths, or for positioning said frames, which are usually oblong in form, lengthwise instead of crosswise in relation to the machine.

The lift bars 41 are provided on their under sides at their ends with vertically disposed notches 42 which receive pins 43 carried by the side blocks 34, thereby permitting the lift bars 41 to be moved vertically, the mechanism for moving said bars vertically being hereinafter set forth The side blocks 34 are also connected together by bars 44, which bars are provided on their outer edges with accurately machined teeth 45 corresponding with the graduated markings 46 thereon. The bars 44, Figure 20, slidably support manually shiftable positioning blocks 47, which blocks comprise the frame supporting members 48 and the bar engaging members 49, the members 48 and 49 of each block being adjustable in relation to each other by means of the thumb nut 50, thereby allowing said members to be accurately positioned in relation to each other and permitting the frame supporting lugs 51 carried by the members 48 to be centered in relation to the graduated markings 46. The negative carrying frame 21 is provided with apertures 52 for the reception of the pins 51, which pin and aperture connection permits the negative carrying vacuum frame to be positioned accurately and readily removed and also permits a limited upward movement of the frame to accommodate the lifting movements of the bars 41 as hereinafter described, without detaching the frame 21 from the pins 51. Each bar engaging member 49 is provided with a spring actuated detent 53, which is forced inwardly by means of the spring 54 and engages the teeth 47 of the guide bar 44, these teeth as well as the graduated markings on the bar being observable through the openings 55 in the slidable member 49 so that the point to which the blocks 47 and the negative carrying frame are to be shifted transversely of the machine may be easily seen and the blocks and frame quickly and accurately positioned. The lifting bars 41 support and carry the negative carrying vacuum frame 21 by engaging the L-shaped arms 56 carried by the frame only during the period when a shift of the carriage is made or when the negative carrying frame is being shifted transversely on the carriage, said lifting bars being raised slightly as will presently appear, to raise the negative carrying frame 21 out of contact with the press plate so the negative and its frame will be clear of and prevented from scratching or damaging the sensitized surface of the press plate 5 in the shifting of the vacuum pressure frame and negative to a new position.

Before describing the mechanism by which the lifting bars 41 are elevated, the operation of the means for adjusting the carriage to locate the negative in different positions over the surface of the sensitized plate will be explained. Assuming that twelve prints are to be made on the same press plate 5, and three rows of four prints each, the first row would be made lengthwise of the machine, proceeding from the left toward the right, as viewed in Fig. 1, the spacing between the prints and the corresponding positions of the carriage having been determined and accomplished by means of the mechanism hereinafter set forth. The negative carrying frame is then shifted on the carriage 22 transversely of the machine to the predetermined point for the next row, and the carriage is returned to the starting point at the left end of the machine and another row of prints is made by moving the carriage toward the right to successive predetermined position. The same procedure is followed for the third row of prints, thereby printing three successive rows of prints each of which is definitely located on the surface of the sensitized plate. The front and rear frame members 31 of the machine have journaled therein two transverse shafts 58 and 60 which are located inwardly from the end frame members. The shaft 60 has fixed thereon two sprocket gears 61 located at the front and rear sides of the machine to be engaged by endless sprocket chains 62. The endless sprocket chains 62 also pass around other sprocket gears 59 which are loosely mounted on the shaft 58 at the front and rear ends thereof. The forward end of the shaft 60 is provided with a squared portion adapted to be engaged by a crank 63 and the chains 62 are connected at 64 with the middle blocks 33 of the carriage frames 32 so that when the shaft 60 is rotated by the crank 63, the movement of the chains serves to effect a movement of the carriage 22 toward the left. The operation of this crank is utilized only for moving the carriage 22 toward the left, as viewed in Figs. 1 and 2, the feeding movement of the carriage toward the right as viewed in those figures being brought about by certain mechanism operated by the shaft 58, and comprising parts which are finely and accurately machined so that there will be no lost motion or variation in the successive operations thereof. The shaft 58 is operated by means of a lever or carriage shifting crank 57 which is keyed on the outer end of that shaft. The extent of the feeding movement is determined by means of a dial 76, this dial and a ratchet wheel 99 being supported by, and mounted for rotation on, a sleeve 103 which is keyed in a stationary position with respect to a fixed bracket 108 and which is rotatably engaged by the shaft 58, as shown particulraly in Fig. 8. The dial 76 and the ratchet wheel 99 are separated by a flange 104 which is formed on the sleeve 103, and the ratchet wheel is retained in position on the outer end of the sleeve by means of a plate 109 secured to the end of the sleeve. The motion of the crank or lever 57 is transmitted to the ratchet wheel 99 by a pawl 98 which is fixed on the lever as shown in Fig. 16. The reverse rotation of the ratchet wheel is normally prevented by another pawl or detent 98 which is mounted on the dial 76. The dial is normally locked against rotation on the sleeve 103 by means of a clutch member 106 formed on the dial and engaging the clutch member 107 formed in the fixed bracket 108. These clutch members are forced into and out of engagement with each other by a locking lever 105 which is threaded on the sleeve 103 on the inner side of the bracket 108 and on the inner side of the frame member which carries the longitudinal scale 101 by means of which the longitudinal position of the carriage 22 is determined. The carriage 22 is provided with a pointer 102 adapted to move in proximity to the scale 101 and, before the carriage 22 is adjusted longitudinally of the machine toward the right, the locking lever 105 is operated to release the clutch members 106 and 107 and the dial 76 is then rotated until the desired graduation thereon is brought into position opposite the graduation on the stationary stop member 100 which is carried by the lower end of the bracket 108, this setting of the dial having been predetermined by reference to the scale 101 and the pointer 102. The locking lever 105 is then operated to lock the dial 76 in adjusted position and the stop 95 adjacent the zero graduation on the dial 76 will then be located properly to limit the throw of the crank or lever 57 at a point corresponding to the limit of the desired movement of the ratchet wheel 99 and the carriage 22.

The rotation of the shaft 58 by the operation of the crank 57 serves to effect a longitudinal movement of the carriage 22, toward the right, as viewed in Figs. 1 and 2, through the operation of pinions 73 which are keyed on the shaft 58 at the front and rear ends thereof and which mesh with the teeth 68 of rack bars 67 mounted for movement longitudinally of the frame 30 and having connection with the carriage 22, as hereinafter described. The front and rear frame members 31 of the machine are provided on their inner sides with shoulders 65 extending the full length thereof and having V-shaped grooves 66 formed therein, as shown in Figs. 10 and 14. Each rack bar 67 is mounted to slide on a shoulder 65 and is provided on its inner side with a V-shaped rib 70 adapted to engage one of the V-shaped grooves 66. On its upper side, each rack bar 67 is provided with ratchet teeth 69 located opposite to the rack teeth 68 which mesh with the pinions 73. The rack bars 67 are held in sliding engagement with the grooves 66 by means of spring plates 71 secured to the frame members 31 by means of bolts 72, as shown particularly in Figs. 7 and 14. These spring plates 71 serve to hold the rack bars 67 in position and at the same time permit the rack bars to be shifted longitudinally of the machine by means of the carriage shift lever or crank 57 and the pinions 73 on the shaft 58 which is rotated by said lever. In Fig. 14, the rack bar 67 is shown shifted to the end of its limit at the right end of the machine, this figure of the drawings showing the parts viewed outwardly from the inner part of the machine. Each middle block 33 of the carriage carries two pivoted pawls 74 which are normally pressed into engagement with the ratchet teeth 69 by means of leaf springs 83. The ends of the pawls 74 engage the ratchet teeth 69 of the adjacent rack bar 67 and these teeth 69 are spaced apart one-sixteenth of an inch, for example, to correspond with the one-sixteenth inch graduations 75 on the face of the dial 76. These dial graduations appear in Fig. 16 to be a greater distance apart than the teeth 69 because of their distance from the shaft 58. One pawl 74 of each pair is of greater length than the other so that the extent to which the carriage 22 is moved depends upon which pawl 74 of each pair is in engagement with the ratchet teeth 69 of the adjacent rack bar 67 when the rack bar is moved by the operation of the crank 57. The pawls 74 are moved into engagement with the ratchet teeth by the springs 83 and are moved out of engagement therewith by means of the cams 84 which are splined on the longitudinal shafts 82 and which are adapted to contact with the projecting extremities 85 of the cam levers, as shown particularly in Fig. 14. The cam shafts 82 extend longitudinally of the machine at the front and rear sides thereof within the frame members 31 and they are actuated by a transverse shaft 80 connected by worms and worm wheels 81 with the shafts 82, as shown in Fig. 13. The shaft 80 is in turn actuated by a longitudinal shaft 78 with which it is connected by the beveled gears 79 and this shaft 78 extends through one end frame 2, as shown in Fig. 13, where it is engaged by the relatively fixed actuating lever 77 mounted for angular movement adjacent a stationary quadrant secured to the end of the machine, as illustrated in Fig. 4. When the lever 77 is in the neutral position illustrated by full lines in Fig. 4, the detents 74 are moved out of engagement with the ratchet teeth 69 against the pressure of the springs 83, thereby permitting the carriage 22 to be withdrawn toward the left, as viewed in Fig. 1, by the operation of the crank 63. When the lever 77 is rocked in one direction or the other from the neutral position, as hereinafter explained, one or the other of the detents 74 is brought into engagement with the ratchet teeth so that the movement of the rack bars will then effect a feeding movement of the carriage.

The shafts 82 also control the operation of certain detent mechanism which is provided for effecting an accurate positioning of the carriage 22 and for locking the carriage in that position after it has been shifted. This mechanism comprises a pair of longitudinally extending toothed bars 86 having accurately machined teeth which are adapted to be engaged by the detents 87 carried by the center blocks 33 of the carriage, as shown particularly in Fig. 15. These detents are spring-actuated and have accurately machined V-shaped points $87^a$ and $87^b$ which are normally out of engagement with the toothed bars 86 but which are adapted to be moved into engagement therewith by means of the cams 88 and 89 which are splined on the shafts 82 adjacent the cams 84. All of these cams 84, 88 and 89 are located between arms of the carriage blocks 33 so that they move longitudinally of the machine with the carriage by reason of their splined connection with the shafts 82. Two of the detents 88 and 89 are provided for each shaft 82 so that one detent of each pair will engage the adjacent toothed bar 86, depending upon the position of the lever 77 by which the angular positions of the shafts 82 are controlled. The teeth of the detents 88 and 89 are so arranged that one of them will engage the adjacent toothed bar 86 at either a one-sixteenth or a one-eighth inch movement of the carriage 22, to correspond with the action of the pawls 74 by which the feeding movement of the carriage is effected through the motion of the rack bars 67.

The angular movement of the shafts 82, effected by the actuation of the lever 77, is also utilized to elevate the lifting bars 41 of the carriage 22. This lifting movement is effected by means of four cams 90, one of which is splined on one of the shafts 82 beneath each of the side carriage blocks 34 of the carriage 22. These cams are engaged on their peripheral surfaces by rollers 92 mounted at the lower ends of plungers 91 which are slidably mounted in the carriage blocks 34 and which carry at their upper ends enlarged heads 93 arranged to underlie the ends of the lifting bars 41, as shown particularly in Figs. 10 and 14. For the purpose of maintaining the plungers normally in contact with the under surfaces of the lifting bars 41, coil springs may preferably be mounted on the plungers 91 between the upper sides of the carriage blocks 34 and the heads 93, as shown in Fig. 14. The cams 90 are mounted to move longitudinally of the shafts 82 when the carriage 22 is shifted longitudinally of the frame. For this purpose, the cams 90 have collars 90ᵃ which are adapted to fit over projections 203 formed on the under sides of the carriage blocks 34, as shown in Fig. 14, the cams being retained in position with respect to these carriage block members by means of pins 205 which are actuated by springs 206 to occupy the normal positions illustrated in Fig. 14 wherein the lower ends thereof engage the annular grooves 204 formed in the cam projections 90ᵃ. The annular grooves 204 permit the cams to rotate and at the same time retain them in proper position beneath the plungers 91. When all of the cams 90 are simultaneously actuated by the turning of the shafts 82, the lifting bars 41 of the carriage 22 are elevated and the vacuum frame 21 is raised until all parts of the vacuum frame and parts carried thereby are out of engagement with the surface of the press plate 5, thereby permitting the carriage 22 to be shifted from one position to another and permitting the vacuum frame to be shifted in its position on the carriage while supported by the lifting bars, without causing injury to the surface of the press plate. When the vacuum frame is elevated by the operation of the cams 90, the pins 51 retain their engagement with the holes in the vacuum frame, as heretofore indicated, so that the vacuum frame moves with the carriage in its adjustment or may be moved on the bars 41 by the movement of the positioning blocks 48 longitudinally on the side carriage bars 44. When the lever 77 is in the neutral position shown by full lines in Fig. 4, the longitudinal shafts 82 are in such positions that the lifting bars 41 are elevated by the cams 90, the carriage locking detents 88 and 89 are out of engagement with the toothed bars 86, and the pawls 74 are out of engagement with the ratchet teeth 69 on the rack bars 67, so that the carriage 22 can be moved to the starting point at the left-hand end of the machine, as viewed in Fig. 1, by means of the crank 63 on the outer end of the shaft 60. When the lever 77 is moved to either of the intermediate positions, indicated by the numeral 94 in Fig. 4 of the drawings, the carriage feeding pawls 74 are moved into engagement with the ratchet teeth of the rack bar 67, but the carriage locking and positioning detents 88 and 89 are still held out of engagement with the toothed bars 86, and the cams 90 are still in such positions that they hold the lifting bars 41 in their elevated positions, so that, with the lever 77 in either of the intermediate positions referred to, the carriage 22 can be given a feeding movement toward the right, as viewed in Fig. 1, by the acuation of the lever or crank 57. The feeding movement of the carriage 22 takes place through a predetermined distance according to the previous setting of the dial 76 and its stop 95. When the carriage 22 has been shifted to the predetermined position, a full throw of the lever 77 to one of the extreme positions 96 or 97, shown in Fig. 4, will cause one of the detents 88 or 89 of each set of detents to engage certain notches of the toothed bars 86, thereby locking the carriage 22 positively at a certain graduation depending upon the previous setting of the dial and at the same time effecting a final positioning movement of the carriage so that it is accurately located in the predetermined position. The position of the lever 77 indicated by the numeral 96 in Fig. 4 corresponds to the operation of the detents for a one-eighth inch graduation on the dial, and the lever position 97 shown in Fig. 4 corresponds to a one-sixteenth inch setting on the dial. The angular movement of the shafts 82 by turning the lever 77 to either of the positions 96 or 97 also operates to turn the cams 90 so that the lifting bars 41 are free to move downwardly by gravity and thereby permit the vacuum frame 21 to lower until its lower sealing ring comes into contact with the press plate. After the sealing ring engages the press plate the operation of the vacuum system will exhaust the air from the region between the negative and the press plate and produce a close contact between them in readiness for exposure to the source of light. The locking detents 88 and 89 are accurately machined and cooperate with the toothed bars 86 with such precision that the slightest lost motion in the carriage feeding means will be corrected by the wedge-shaped ends of the detents as they are forced into engagement with the teeth of the bar, thereby causing the carriage to be moved into the precise position required by the setting of the dial. Exact equal spacing movements of the carriage for corresponding settings of the dial are thus obtained and a positive locking of the carriage is obtained at the same time.

When the lever 57 is moved in the direction of the arrows *a* in Fig. 16, the spring pawls 98 engage the ratchet wheel 99 and cause this wheel to rotate until the lever 57 engages the stop 95, at which time the lever returns to the stop 100, the return movement of the lever not causing a rotation of the ratchet wheel 99 so that the carriage may be intermittently moved toward the right to various predetermined positions corresponding to the desired predetermined positions of the negative over the press plate as determined by the scale 101 and the pointer 102.

Since the source of light is located above and separately from the machine, it is necessary to provide means for protecting from the light rays those portions of the press plate which are not disposed below the vacuum pressure frame or below the negative during the time that the negative is being exposed and also during the movements of the carriage and vacuum frame in case the light is in operation during those movements. For this purpose of protecting the sensitized press plate from the action of light, curtains are employed. These curtains include two end curtains 110 and two side curtains 111. These curtains wind on self-winding spring rollers 112 which are carried by the end members of the frame 2 and by rollers 113 carried by the central blocks 33 of the carriage as shown in Fig. 1. The curtains 110 pass downwardly and inwardly over guide rollers 114 and are attached to the undersides of L-shaped metal members 115 shown in Figs. 17 to 19 inclusive. The L-shaped members are provided with hinged plates 116 and end blocks 117, which end blocks are provided with spring pressed pins 118 adapted to engage the annular grooves 119 of pins 120 extending from the sides of the side blocks 34 of the carriage. These curtains are as wide as the bed plate 3 and the hinged plates 116 thereof are adapted to extend beneath the tooth cross bars 44 of the carriage and in close relation to the underside thereof thereby excluding light rays from the sensitized press plates as shown in Fig. 7. The curtains automatically wind on conventional forms of rollers, such for instance as window shade rollers and wind up and follow the carriage as it is shifted longitudinally of the machine. The curtains are detachable from the carriage blocks by simply raising the spring pressed pins 118, the members or blocks 117 sliding on rods 121 extending from end to end of the machine to hold the freed ends of the curtains off of the press plate 5 when applying or detaching the same from the carriage, it being necessary to detach the curtains, as it is necessary to remove the cross members of the carriage when applying or removing the press plate from the machine. The hinged plates 116 may be swung to an upright position as shown by dotted lines in Figure 18 when the curtains are detached and curtains wound on their rollers in order that the sealing plates 23 may be raised and lowered without interference from adjacent mechanism.

The side curtains 111 extend upwardly and inwardly over the guide rollers 122 and are provided at their ends with L-shaped plates 123 which carry looped members 124 which engage over pins 125 on the negative carrying frame, and which also wind and unwind as said frame is shifted transversely of the machine. All four curtains have a marginal overlapping relation so as to exclude light from the sensitized press plate 5 not covered by the negative in the shifting operation of the latter. The ends of these curtains are also easily detachable from the vacuum pressure frame.

From the above it will be seen that an offset press plate machine is provided, which is simple in construction, positive in its operation, and one wherein a vacuum pressure frame may be accurately positioned at predetermined positions above a press plate, then moved into engagement with the press plate, locked to position until after the printing operation, then raised out of engagement and moved to a new position. It will also be seen that by providing the sealing bars the entire surface of the press plate 5 may be utilized.

I claim:

1. The combination with the bed plate of a machine for photographically preparing offset press plates, of a resilient blanket carried by said bed plate, and means operable for stretching the blanket whereby the degree of stretch thereof may be varied.

2. The combination with a bed plate of a machine for photographically preparing press plates, of a resilient blanket extending over said bed plate, and means operable for stretching and holding said blanket whereby it will closely engage the bed plate.

3. The combination with the bed plate of a machine for photographically preparing press plates, of a resilient blanket covering said bed plate, one end of said blanket being attached to one end of the bed plate, a roller, the other end of said blanket being attached to said roller, and means whereby said roller may be rotated for drawing and holding the blanket taut.

4. The combination with the bed plate of a machine for photographically preparing press plates, said bed plate being adapted to receive a sensitized press plate, a movable negative carrying frame disposed above the bed plate and press plates, of adjustable means cooperating with the ends of the press plate whereby said negative carrying frame may be positioned beyond the end of the press plate.

5. The combination with the bed plate of a machine for photographically preparing press plates, said bed plate being adapted to receive a press plate, a negative carrying frame disposed above the bed plate, of sealing bars disposed adjacent the ends of the bed plate and adapted to engage the ends of the press plate and form an extended base for the negative carrying frame.

6. The combination with the bed plate of a machine for photographically preparing press plates, said bed plate being adapted to receive a press plate, a movable negative carrying frame disposed above the bed plate, of pivoted sealing bars adjacent the ends of the bed plate and forming means whereby the side of the negative carrying frame may be disposed beyond the ends of the press plate carried by the bed plate.

7. The combination with the bed plate of a machine for photographically preparing press plates, said bed plate being adapted to receive a press plate, a negative carrying frame disposed above the bed plate, of a sealing bar disposed adjacent the end of the bed plate and engaging the end of the press plate and forming a base for a portion of the negative carrying frame.

8. The combination with the bed plate of a machine for photographically preparing press plates, said bed plate being adapted to receive a press plate, a movable negative carrying frame disposed above the bed plate, of a pivoted sealing bar adjacent the ends of the bed plate and adapted to have its free end engage the end of the press plate thereby allowing a portion of the negative carrying frame to be disposed beyond the edge of the press plate.

9. The combination with the bed plate of a machine for photographically preparing press plates, said bed plate being adapted to receive a press plate, a movable negative carrying frame disposed above the bed plate, of pivoted sealing bars disposed adjacent the ends of the bed plate, the free ends of said bars cooperating with the press plate to form a substantially air tight seal and support the negative carrying frame beyond the ends of the press plate, and means whereby said sealing bars may be simultaneously controlled.

10. The combination with a bed plate of a machine for photographically preparing press plates, said bed plate being adapted to receive a press plate, a movable negative carrying frame disposed above the bed plate, of pivoted sealing bars disposed adjacent the free ends of the bed plate and cooperating with the press plate and support the negative carrying frame beyond the ends of the press plate, and means whereby said sealing bars may be controlled in their pivotal movement.

11. The combination with a bed plate of a machine for photographically preparing press plates, said bed plate being adapted to receive a press plate, a movable negative carrying frame disposed above the bed plate, of pivoted sealing bars disposed adjacent the free ends of the bed plate and cooperating with the press plate and support the negative carrying frame beyond the ends of the press plate, and shaft and gear means whereby said sealing bars may be controlled in their pivotal movement.

12. The combination with a bed plate of a machine for photographically preparing press plates, said bed plate being adapted to receive a press plate, a movable negative carrying frame disposed above the bed plate, of pivoted sealing bars disposed adjacent the free ends of the bed plate and cooperating with the press plate and support the negative carrying frame beyond the ends of the press plate, and shaft and gear means whereby said sealing bars may be simultaneously moved into and out of engagement with the press plate.

13. A machine for photographically preparing offset press plates including a base to support a sensitized press plate, a carriage disposed above the base, said carriage being movable towards opposite sides of the machine, a negative carrying frame carried by said carriage, said negative carrying frame being transversely movable at an angle to the first mentioned movement of the carriage, and curtain means attached to and controlled by the movement of the carriage and negative carrying frames whereby portions of the press plate outside of the frame will be protected from light rays.

14. The combination with a machine for photographically preparing offset press plates, said machine comprising a bed plate for the reception of a press plate, a carriage movable above the bed plate, a negative carrying frame movable on the carriage at an angle to the direction of movement of the carriage, of curtains attached to and controlled by said carriage and frame whereby the sensitized plate which is not exposed to the negative will be covered.

15. The combination with a machine for photographically preparing offset press plates, said machine comprising a bed plate for the reception of a press plate, a carriage movable adjacent said press plate, of curtains for protecting the unexposed portion of the press plate, a negative carrying frame carried by said carriage, said curtains having their free ends connected to the carriage and controlled by the movement thereof.

16. The combination with a machine for photographically preparing offset press plates, said machine comprising a bed plate for the reception of a press plate, a carriage movable above the bed plate, a negative carrying frame movable on the carriage, of curtains carried adjacent the sides of the machine, the free ends of opposite curtains being connected to the carriage, the free ends of the other opposite curtains being connected to the negative carrying frame, whereby the movement of said carriage and frame controls the movement of the curtains.

17. The combination with a machine for photographically preparing offset press plates, said machine comprising a bed plate for the reception of a press plate, a carriage movable above the bed plate, curtains carried at the opposite sides of the machine, the free ends of said curtains being detachably connected to the carriage and the movement of the carriage controlling the movement of the curtains.

18. The combination with a machine for photographically preparing offset press plates, said machine comprising a bed plate for the reception of the press plate, a carriage movable above the bed plate, curtains carried at opposite sides of the machine, said curtains having their free ends detachably connected to the carriage, and hinged extension members carried by the free ends of the curtains and underlying the opposite sides of the carriage.

19. The combination with a machine for photographically preparing offset press plates, said machine comprising a bed plate for the reception of a press plate, a carriage movable above said bed plate, a negative carrying frame movable on the carriage at an angle to the direction of movement of the carriage, of roller carried curtains at the opposite sides of the machine, the free ends of opposite curtains being detachably connected to the carriage and the free ends of the other oppositely disposed curtains being detachably connected to the negative carrying frame and means cooperating with the rollers for winding up the curtains whereby the curtains play out and wind up under movement of said carriage and frame.

20. The combination with a machine for photographically preparing offset press plates, said machine comprising a bed plate for the reception of a press plate, of a carriage carried by said machine for supporting a negative carrying frame, of means for adjusting the distance between the carriage members bearing the negative carrying frame, whereby different sizes of negative carrying frames may be supported by said carriage.

21. The combination with a machine for photographically preparing offset press plates, said machine comprising a bed plate for the reception of a press plate, of a carriage movable on said machine above the bed plate, said carriage comprising spaced supporting blocks mounted on trackways, bars connecting opposite blocks, means for supporting a negative carrying frame on said bars and means whereby said blocks may be adjusted in relation to each other whereby different sizes of negative carrying frames may be received.

22. The combination with a machine for photographically preparing offset press plates, said machine comprising a bed plate for the reception of a press plate, of a carriage carried by said machine above the bed plate, a negative carrying frame supported on said carriage and movable thereon, said carriage comprising spaced blocks mounted on trackways at oposite sides of the machine, frame supporting bars connecting said blocks, and means whereby said blocks at each side of the machine may be adjusted towards and away from each other.

23. The combination with a machine for photographically preparing offset press plates, of a negative carrying frame carriage for said machine, said carriage being provided with means for varying the dimensions thereof whereby negative carrying frames of different size may be received.

24. The combination with a machine for photographically preparing offset press plates, of a negative carrying frame carriage for said machine, said carriage being mounted on trackways at opposite sides of the machine, the ends of the carriage being formed from spaced blocks, connecting bars between the blocks at each end of the carriage, means whereby said blocks may be adjusted towards and away from each other, negative frame supporting bars connecting the end blocks together and extending across the machine, and means whereby the negative carrying frame may be positioned on the carriage at a predetermined point.

25. The combination with the bed plate of a machine for photographically preparing press plates, said bed plate having a resilient blanket thereon, of means for holding a press plate in close engagement with the blanket, said means comprising a clamping member carried adjacent one end of the bed plate and adapted to receive one end of the press plate, a bar having a slidable connection with the other end of the bed plate, means for forcing said bar away from the end of the bed plate, and clamping means carried by said bar for receiving and holding the end of the press plate.

26. The combination with a longitudinally movable carriage of a machine for photographically preparing offset press plates, said carriage having mounted thereon a negative carrying frame, of means for moving said carriage to successive predetermined positions longitudinally of the machine, said means being lever controlled, cooperating cam and pawl means for locking said carriage at the predetermined positions, and means for returning the carriage to initial position independent of the cam and pawl locking means.

27. The combination with a longitudinally movable carriage of a photographically preparing offset press plate machine, said carriage having mounted thereon a negative carrying frame, of means for moving said carriage to predetermined positions longitudinally of the machine, said last named means being lever controlled, locking pawls for locking the carriage at the predetermined positions, lever means for controlling said pawls, cams controlled by said lever means and cooperating with the pawls, said lever means forming means for releasing the pawls, and means for returning the carriage to initial position.

28. The combination with a longitudinally movable carriage of a photographically preparing press plate machine, said carriage having mounted thereon a movable negative carrying frame, said negative carrying frame having a connection with the carriage whereby it may move vertically, lifting bars carried by the carriage and cooperating with the frame for moving the same vertically, and lever controlled means whereby said lifting bars will raise the frame when the carriage and frame are moved from one position to another.

29. The combination with a negative carrying frame, said negative carrying frame being movably mounted on a movable carriage of a machine for photographically preparing offset press plates, of means for moving said negative carrying frame vertically on the carriage when the frame and carriage are moved from one position to another, said means comprising lifting bars cooperating with the frame, and lever controlled camming means whereby said lifting bars may be raised.

30. The combination with a movable carriage of a machine for photographically preparing offset press plates, said machine having vertically movable thereon by means of lift bars a negative carrying frame, of means for moving said carriage to a predetermined point, said means comprising rack bars disposed adjacent the ends of the carriage slidably mounted, lever controlled gears meshing with said rack bars, spring actuated pawls carried by the carriage, said spring actuated pawls cooperating with ratchet teeth on the rack bars, spring actuated pawls cooperating with rack teeth on the machine, and lever controlled cam means whereby said carriage after being moved to a predetermined position may be locked and the lift bars lowered.

31. A carriage operating mechanism for machines for photographically preparing offset press plates, said controlling mechanism comprising rack bars longitudinally movable, lever controlled gear means for moving said rack bars a predetermined distance, spring actuated pawls carried by the carriage and cooperating with ratchet teeth carried by the rack bars, spring actuated pawls carried by the carriage and cooperating with teeth carried by rack bars on the machine, negative frame lifting bars carried by the carriage and lever controlled cam means whereby after the carriage has been moved to a predetermined position said carriage will be locked, the lift bars lowered for a printing operation, the lift bars raised after a printing operation, and the spring actuated pawls for locking and feeding the carriage rendered inoperative, thereby allowing the carriage to be returned to initial position.

32. The combination with a movable carriage of a machine for photographically preparing offset press plates, said carriage being provided with lift bars for moving a negative frame into engagement with the press plate, of means for controlling said carriage and lift bars, said means comprising longitudinally movable rack bars, lever controlled means for moving said rack bars predetermined distances, spring actuated pawl connections between the carriage and rack teeth carried by the rack bar, toothed bars carried by the machine adjacent the ends of the carriage, locking detents carried by the carriage and cooperating with the teeth of the toothed bars, and lever controlled cam means whereby after the carriage has been moved to a predetermined point, the carriage feeding pawls after the printing operation will be disengaged, the locking pawls disengaged, and the carriage allowed to be returned to initial position.

33. The combination with a movable carriage of a machine for photographically preparing offset press plates, said carriage being provided with lift bars for controlling the movement of the negative carrying frame, movable rack bar means for moving the carriage to predetermined positions.

pawl and ratchet teeth connection between the rack bar and the carriage, cam controlled detents carried by the carriage and cooperating with teeth carried by the machine for locking the carriage at predetermined positions, cam means for lowering the lift bars after the locking operation, cam means for raising the lift bars after a locking operation and rendering the pawl and rack connections inoperative, unlocking the carriage, and allowing the same to be returned to initial position.

34. The combination with a movable negative carrying frame carriage of a machine for photographically preparing offset press plates, of means for moving said carriage to predetermined points, said means comprising a longitudinally movable rack bar, spring means for holding said bar frictionally, spring actuated pawls carried by the carriage, said spring actuated pawls cooperating with the ratchet teeth carried by the rack bar, a dial having graduations thereon corresponding to the graduations of the teeth of the rack bar with which the pawls cooperate, and lever controlled cam means for disengaging said pawls.

35. The combination with a movable negative carrying frame carriage of a machine for photographically preparing offset press plates, of means for moving said carriage to predetermined positions, said means comprising a longitudinally movable rack bar, spring means for holding said rack bar against displacement, spring actuated pawls carried by the carriage, said spring actuated pawls cooperating with ratchet teeth carried by the rack bar, said ratchet teeth and pawls being positioned in such a manner that when one of the pawls is between the teeth the other pawl will engage the adjacent tooth, a dial, a shaft extending through said dial, said shaft being provided with a gear, an operating handle rotating said shaft a predetermined distance between stops adjacent graduations on the dial, said dial graduations corresponding with the spacing of the ratchet teeth.

36. The combination with a longitudinally movable carriage of a photographically preparing press plate machine, of a member slidably carried by the machine, means permitting selective points of connection between said slidable member and the carriage for moving the latter in the movement of the former, and means for shifting the slidable member.

37. The combination with a longitudinally movable carriage of a photographically preparing press plate machine, of a shiftable member carried by the machine, means permitting selective points of connection between said shiftable member and the carriage, means for locking the carriage against movement, and control means operative in its movement for actuating said locking means and breaking the connection between the shiftable member and the carriage.

38. The combination with a longitudinally movable carriage of a photographically preparing press plate machine, of lifting means carried by said carriage, a negative frame having connection with said lifting means, means for locking the carriage against movement, and means operable for lowering said lifting means for a printing operation and actuating said locking means for locking the carriage against movement.

39. The combination with a longitudinally movable carriage of a photographically preparing press plate machine, of lifting means carried by said carriage, a negative frame adapted to be raised and lowered through the action of said lifting means and alternately supported by said lifting means and press plate, means for locking the carriage in the printing position, and a control member operable in its movement to actuate said carriage locking means and lifting means in unison.

40. The combination with a longitudinally movable carriage of a photographically preparing press plate machine, of lifting means carried by said carriage, a negative frame mounted on said carriage, means effecting a connection between the negative frame and said lifting means upon an upward movement of the lifting means and a disconnection therebetween upon a lowering of the lifting means and means for controlling the lifting means.

41. The combination in a machine for photographically preparing press plates, of means for supporting a press plate, negative carrying means mounted for movement to locate a negative in various positions opposite said press plate, and vacuum pressure means movable with said negative carrying means to effect a close contact between the negative and press plate in the various relative positions thereof.

42. The combination in a machine for photographically preparing press plates, of means for supporting a press plate, a flexible backing for said press plate, negative carrying means mounted for movement to position a negative at various points opposite said press plate, and vacuum pressure means movable with said negative carrying means to effect a close contact between the negative and the press plate in the various relative positions thereof.

43. The combination in a machine for photographically preparing press plates, of a flexible blanket adapted to support a press plate, negative carrying means mounted for movement to position a negative at various positions opposite said press plate, and vacuum pressure means movable with said negative carrying means for effecting a close contact between said negative and said press plate in the various relative positions thereof.

44. The combination in a machine for photographically preparing press plates, of a horizontal bed plate, a flexible blanket mounted on said press plate and adapted to support a press plate, negative carrying means mounted for movement to position a negative at various positions opposite said press plate, and means for pressing said negative and said press plate into close contact in the various relative positions thereof.

45. The combination in a machine for photographically preparing press plates, of means for supporting a press plate, means for supporting a negative opposite said press plate, means for moving said last named supporting means to locate the negative in various positions including positions overlapping an edge of said press plate, and vacuum pressure means for securing a close contact between said negative and said press plate in all of said positions.

46. The combination in a machine for photographically preparing press plates, of a flexible blanket adapted to support a press plate, a negative carrying frame movable to locate a negative in various positions over said press plate including positions overlapping an edge of said press plate, and vacuum pressure means adapted to cooperate with said press plate and said blanket for effecting close contact between said negative and said press plate in all of the positions thereof.

47. The combination in a machine for photographically preparing offset press plates, of means for supporting a press plate, a carriage movable over said press plate, a negative frame movable on said carriage at right angles to the movement of said carriage, and means associated with said negative frame for permitting the air to be exhausted from the region between the negative and the press plate in all positions of said negative frame.

48. The combination in a machine for phographically preparing press plates, of means for supporting a press plate, a negative carrying frame mounted for movement over the surface of said press plate, said negative carrying frame and said negative being movable to locate a negative in a position overlapping an edge of said press plate, means forming flat surfaces extending outwardly beyond said edge of said press plate to partially support said negative carrying frame in said overlapping position, and vacuum pressure means associated with said negative frame for securing close contact between the negative and press plate in said overlapping position.

49. The combination in a machine for photographically preparing press plates, of means for supporting a press plate, a carriage movable over said press plate, a vacuum frame mounted for movement on said carriage, means for raising said vacuum frame from and lowering it into contact with said press plate, means associated with said vacuum frame for carrying a negative, and means operative when said vacuum frame is in contact with said press plate for exhausting the air from the region between said negative and said press plate.

50. The combination in a machine for photographically preparing press plates, of means for supporting a press plate, means associated with said supporting means for forming flat surfaces extending beyond the edges of said press plate, a carriage movable parallel to the surface of said press plate, a vacuum frame mounted for movement with said carriage for positioning said vacuum frame in various positions including positions wherein it overlaps the edges of said press plate and extends over said flat surfaces, means for raising said vacuum frame from and lowering it into contact with said press plate and said flat surfaces, means associated with said vacuum frame for supporting a negative, and means for permitting the air to be exhausted through said vacuum frame from the region between said negative and said press plate when said vacuum frame is in contact with said press plate and said surfaces.

51. The combination in a machine for photographically preparing press plates, of a frame, means mounted on the said frame for supporting a press plate, a carriage mounted for movement on said frame, a negative carrier mounted on said carriage, mechanism for effecting said movement of said carriage to locate said negative carrier in different positions over the surface of said press plate, graduated means for predetermining the extent of operation of said mechanism, and means for effecting relative movement of said negative carrier and said press plate to bring the press plate and negative into close contact.

52. The combination in a machine for photographically preparing press plates, of a frame, a carriage mounted for movement on said frame, mechanism for effecting said movement of said carriage, graduated means for predetermining the extent of operation of said mechanism, and precision means operative after the actuation of said mechanism for accurately positioning said carriage according to the indication of said graduated means.

53. The combination in a machine for photographically preparing press plates, of a frame, a carriage mounted for movement on said frame, means for moving said carriage on said frame and locating it approximately in a predetermined position, graduated means for indicating said predetermined position, and precision mechanism operative after said carriage has been moved to said approximate position for accurately locating said carriage in a predetermined position according to said graduated means.

54. The combination in a machine for photographically preparing press plates, of means for supporting a press plate, a carriage movable parallel to the surface of said press plate, a negative carrying frame mounted on said carriage, means for moving said carriage to predetermined positions with respect to said press plate, and means for effecting a final accurate positioning of said carriage after the operation of said moving means.

55. The combination in a machine for photographically preparing press plates, of means for supporting a press plate, a carriage movable parallel to the surface of said press plate, means movable with said carriage for supporting a negative, a bar positioned adjacent the path of movement of said carriage and having accurately formed notches therein, operating mechanism for moving said carriage to approximate predetermined position, and a positioning member movable with said carriage and adapted to engage a notch of said bar after the operation of said moving means for finally locating said carriage accurately in a predetermined position.

56. The combination in a machine for photographically preparing press plates, of means for supporting a press plate, a negative carrying frame movable parallel to the surface of said press plate, a positioning bar extending parallel to the path of movement of said negative carrying means, and means movable with said negative and cooperating with said positioning bar for finally positioning said negative carrying means and holding it in predetermined position.

57. The combination in a machine for photographically preparing press plates, of means for supporting a press plate, negative carrying means movable parallel to the surface of said press plate, a toothed bar extending parallel to the path of movement of said negative carrying means, a slidably mounted member movable parallel to said toothed bar and having connection with said negative carrying means, and an accurately machined member movable with said slidably mounted member and adapted to cooperate with the teeth on said bar for accurately positioning said slidably mounted member and said negative carrying means.

58. The combination in a machine for photographically preparing press plates, of means for supporting a press plate, a carriage movable over the surface of said press plate, means for feeding said carriage through successive predetermined movements in one direction to a plurality of different predetermined positions, means for disconnecting said carriage from said feeding means, and separate mechanism carried by said supporting means and attached to said carriage for returning said carriage in the opposite direction while said feeding means is disconnected.

59. The combination in a machine for photographically preparing press plates, of a frame, a carriage mounted for movement on said frame, a bar mounted to travel on said frame in the direction of movement of said carriage, means for connecting said carriage with said bar at selected predetermined points on said bar, and means for moving said bar to effect the movement of said carriage.

60. The combination in a machine for photographically preparing press plates, of means for supporting a press plate, a carriage movable parallel to the surface of said press plate, negative carrying means mounted on said carriage, a member movable parallel to the path of movement of said carriage, means for moving said member through predetermined distances, and means for detachably forming a connection between said member and said carriage.

61. The combination in a machine for photographically preparing press plates, of a frame, a carriage mounted for movement on said frame, a bar mounted to travel on said frame in the direction of movement of said carriage, said bar being provided with ratchet teeth, a pawl mounted on said carriage, means for actuating said pawl to engage a tooth of said bar, and means for moving said bar to effect the movement of said carriage.

62. The combination in a machine for photographically preparing press plates, of a frame, a carriage mounted for movement on said frame, a bar mounted to travel on said frame in the direction of movement of said carriage, said bar being provided with a plurality of ratchet teeth, a pair of pawls mounted on said carriage and adapted in a given position of said carriage to engage different teeth of said bar, means for selectively actuating said pawls to engage the teeth of said bar, and means for moving said bar and thereby moving said carriage.

63. The combination in a machine for photographically preparing press plates, of a frame, a carriage movable on said frame, a member movable parallel to the path of movement of said carriage, means for actuating said member, means for connecting said member to said carriage, means for locking said carriage in position after the movement thereof, and means for simultaneously operating said locking means and disconnecting said connecting means.

64. The combination in a machine for photographically preparing press plates, of means for supporting a press plate, a carriage movable parallel to the surface of said press plate, a negative carrying frame mounted on said carriage for movement toward and from said press plate, means for moving said carriage, means for locking said carriage in position after movement thereof, and means for simultaneously releasing said locking means and moving said negative carrying frame away from said press plate.

65. The combination in a machine for photographically preparing press plates, of means for supporting a press plate, a carriage movable parallel to the surface of said press plate, a negative carrying frame mounted on said carriage for movement toward and from said press plate, a feeding member movable parallel to the path of movement of said carriage, connecting means for securing said feeding member to said carriage, locking means for accurately positioning said carriage and securing it in position after the movement of said feeding member, and means for controlling the operation of said connecting means and of said locking means and effecting movement of said negative carrying frame toward and from said press plate.

66. The combination in a machine for photographically preparing press plates, of a negative carrying frame, a graduated bar, a positioning member slidably mounted on said bar and having a connection with said negative carrying frame, means carried by said positioning member for accurately positioning said member with respect to the graduations on said bar, and means for relatively adjusting parts carried by said member for accurately locating the point of connection of said member and said negative carrying frame with respect to said positioning means and said graduations.

67. The combination in a machine for photographically preparing press plates, of means for supporting a press plate, a vacuum frame mounted for movement to different positions over the surface of said press plate, means mounted on said vacuum frame for carrying a negative, and air sealing means carried by said vacuum frame for contacting with the upper surface of the negative inwardly of the edges of the negative and for contacting with the press plate around the negative.

68. The combination in a machine for photographically preparing press plates, of means for supporting a press plate, a vacuum frame mounted for movement to different positions over the surface of said press plate, means mounted on said vacuum frame for carrying a negative, air sealing means carried by said vacuum frame for contacting with the upper surface of the negative inwardly of the edges of the negative and for contacting with the press plate around the negative, and means for permitting air to be exhausted from the region between the negative and the press plate when said sealing means is in contact with the press plate.

69. The combination in a machine for photographically preparing press plates, of means for supporting a press plate, a vacuum frame mounted for movement to different positions over the surface of said press plate, means mounted on said vacuum frame for carrying a negative, air sealing means carried by said vacuum frame for contacting with the upper surface of the negative inwardly of the edges of the negative and for contacting with the press plate around the negative, means for permitting air to be exhausted from the region between the negative and the press plate when said sealing means is in contact with the press plate, and means for actuating said vacuum frame to move said sealing means out of contact with said press plate.

In testimony whereof, I have subscribed my name.

ALEXANDER T. KOPPE.